United States Patent [19]

Richards

[11] Patent Number: 5,270,812
[45] Date of Patent: Dec. 14, 1993

[54] METHOD OF ENCODING IMAGE PIXEL VALUES FOR STORAGE AS COMPRESSED DIGITAL DATA AND METHOD OF DECODING THE COMPRESSED DIGITAL DATA

[75] Inventor: Norman D. Richards, Horsham, England

[73] Assignee: U.S. Philips Corporation, New York, N.Y.

[21] Appl. No.: 733,927

[22] Filed: Jul. 22, 1991

[30] Foreign Application Priority Data

Jul. 20, 1990 [GB] United Kingdom ............... 9015986

[51] Int. Cl.⁵ .................... H04N 7/13; H04N 7/137
[52] U.S. Cl. .................................. 358/133; 358/136
[58] Field of Search ............... 358/13, 135, 136, 310, 358/133; 375/28

[56] References Cited

U.S. PATENT DOCUMENTS

| | | | |
|---|---|---|---|
| 4,857,992 | 8/1989 | Richards | 358/135 |
| 4,858,026 | 8/1989 | Richards | 358/135 |
| 4,868,764 | 9/1989 | Richards | 358/31 |
| 5,014,127 | 5/1991 | Richards | 358/135 |

FOREIGN PATENT DOCUMENTS

0272762 6/1988 European Pat. Off. .
0272763 6/1988 European Pat. Off. .

*Primary Examiner*—Howard W. Britton
*Assistant Examiner*—Richard Lee
*Attorney, Agent, or Firm*—Leroy Eason

[57] ABSTRACT

A method of encoding an image for CD-I players comprises obtaining the pixel information as a first matrix (M1) of 768×560 pixel component values, decimation filtering (1) the first matrix (M1) to produce a second matrix (M2) of 384×560 pixel component values, encoding (2) the second matrix (M2) to produce a first set of DYUV digital data (RDD1) for storage on a compact disc (SM), applying the digital data (RDD1) to a decoder (3) to form a third matrix (M3) of 384×560 pixel component values, interpolation filtering (4) the third matrix (M3) to form a fourth matrix (M4) of 768×560 pixel component values, forming the difference (5) between the first (M1) and fourth (M4) matrices to produce a fifth matrix (M5) of 768×560 difference values and encoding the fifth matrix (M5) as respective multi-bit and/or run length codes (RDD1) for storage on a compact disc (SM). Compatibility with known hardware (the CD-I standard 'basecase' player) is obtained by encoding negative difference values using the quantization levels in the guard range (0–15) below black level (16, on a scale of zero to 255).

12 Claims, 4 Drawing Sheets

METHOD OF ENCODING IMAGE PIXEL VALUES FOR STORAGE AS COMPRESSED DIGITAL DATA AND METHOD OF DECODING THE COMPRESSED DIGITAL DATA

BACKGROUND OF THE INVENTION

1. Field of the Invention

The invention relates to image display n particular to a method of image encoding by which pixel information for an image is encoded into digital data which can be recorded on or in a suitable storage device and to a method of decoding by which such digital data may be decoded to reconstitute the original pixel information.

The invention relates in particular to a method of image encoding which comprises the steps: a) receiving the pixel information in the form of a first matrix of $m \times n$ pixel component values where m and n are integers, b) decimation filtering the first matrix of pixel component values to produce a second matrix $m/a \times n/b$ pixel component values of reduced density where a and b are factors of m, c) encoding the second matrix of pixel component values into a first set of digital data for storage, by reference to a finite range of unsigned quantisation values, which range includes a guard range extending below black level, d) decoding the encoded second matrix of pixel component values to form a third matrix of $m/a \times n/b$ pixel component values, e) expanding the third matrix of pixel component values to form a fourth matrix of $m \times n$ pixel component values, f) forming the difference between the fourth and the first matrix pixel-by-pixel to produce a fifth matrix of $m \times n$ difference values, and g) encoding the fifth matrix of difference values into a second set of digital data for storage, 2. Description of the Related Art Such a method is described in published European patent applications EP-0272762-A and EP-0272763-A and allows a high resolution image (for example 768×560 pixels) to be encoded for storage in an efficient manner by the encoding of a low resolution image (384×280 pixels) in the first set of data together with a high resolution difference image in the second set of data. Since the difference image contains only the high spatial frequency components of the image, it can be coded with a high degree of compression, so that the two sets of data occupy less space than would otherwise be required to store the high resolution image. The known method was developed in particular with a view to storage of the two sets of digital data in a compact Disc-Read Only Memory (CD-ROM) for use in a display apparatus constructed in accordance with standards which have been established for Compact Disc-Interactive (CD-I) players. The limited data rate when reading from a CD-JTOM disc would then be just adequate to allow derivation therefrom of a display of a 784×560 pixel image within a time delay acceptable to the average user.

The CD-I standards define a 'base case' CD-I player as one providing the lowest level of compatibility. Unfortunately, the difference values of the fifth matrix can be positive or negative with equal probability, while the decoder for pixel values in the base case CD-I player is constructed for the generation of unsigned (positive) colour values only. The decoding in the base case CD-I player is based on CCIR recommendations for 8-bit (per component) picture coding, namely an unsigned value in the range zero to 255 with black level at 16 and peak white at 235. The guard ranges at 0–15 and 236–255 serve to prevent arithmetic overflow errors arising from overshoot and other small errors in the differential coding of images.

The coding method previously disclosed therefore required hardware in the display apparatus which is not present in a 'base case' CD-I player. While it is always possible to define extensions to the standard player to produce players with enhanced functionality, this is contrary to the objectives of standardisation in the marketplace. Furthermore, for a disc to be compatible with both base case players and extended players would require storage thereon of the high resolution image in its uncompressed form side by side with the first and second sets of digital data—a very inefficient use of the finite storage capacity of the CD-ROM.

SUMMARY OF THE INVENTION

It is an object of the invention to enable the provision of an efficient form of encoding of pixel information for at least one component part of a plurality of pixels, and which can be decoded using only the facilities provided in a base case CD-I player.

The invention provides a method of image encoding as set forth in the second opening paragraph characterized in that, in step (g) the difference values are encoded by reference to the same finite range of unsigned values as is used in step (c), negative difference values being represented by values within the guard range.

The invention exploits the characteristics of video signal mixing as implemented in the base case player for combining video images and text or graphics. By use of values within the guard range below black level, which values would not normally arise in a text or graphics image, negative difference values down to $-16$ can be effectively encoded for the base case player.

The invention further provides a method of decoding digital data obtained by the above encoding method to reconstruct the original pixel information comprising the steps of h) decoding the first set of digital data to reconstruct the third matrix of $m/a \times n/b$ pixel component values, i) expanding the third matrix to reconstruct the fourth matrix of $m \times n$ pixel component values. j) decoding the second set of digital data to reconstruct the fifth matrix of $m \times n$ difference values, and k) adding the fifth matrix to the fourth matrix on a pixel-by-pixel basis to reconstruct the first matrix of $m \times n$ pixel component values.

This method of decoding can be performed by the base case CD-I player without requiring any additional special hardware to perform such decoding. The third matrix is produced by one of the two decoders in the base case player, while the fifth matrix is produced by the other of such video decoders. The combining circuit in the base case player will add the outputs of the two decoders, taking account of the guard range, and hence reconstruct the enhanced resolution picture.

The invention as described so far allows negative values only as large as the guard range ($-16$ in CD-I standard). This may not be adequate in some cases. Accordingly the method may be further characterized by the step, prior to the encoding in step (c), of subtracting a first given value from the component value of each of the pixels of the first or second matrix.

This has the effect of displacing the zero level for encoding of difference values, so that negative values as large as the guard range and the first given value added together can be encoded. Information lost as a result of the subtraction is automatically incorporated into the second set of digital data. The first given value should not be too large, however, or else low resolution (low spatial frequency) information will find its way into the second set of digital data, reducing the potential for compression of that data and/or leading to noise in the displayed image. In practice a compromise value can be reached for optimum effect over a range of images, over one particular image or even over one part of an image.

The step b) may comprise taking the average of each pair of pixels along the row of the matrix to produce a matrix of m/2×n pixel component values. Thus, the number of horizontal pixels is divided by two. It would alternatively be possible to use other filtering and sub-sampling methods to reduce the number of pixels in the horizontal direction. For example, the first matrix could be low-pass filtered and sub-sampled to obtain the reduced resolution matrix.

The pixel component values may be encoded as separate matrices of luminance (Y) and colour difference (U,V) values, while only the luminance component is enhanced to high resolution by storage of a second set of digital data.

By encoding the luminance and colour difference components in separate matrices, it is possible to produce different resolutions for the luminance and colour difference components. In general the eye is less sensitive to detail in the colour difference signals and these can be of lower resolution than the luminance. This method of encoding will reduce the storage requirement for the signals over an RGB encoding and will reduce the rate at which data has to be read from the storage medium in order to be displayed.

The step c) may include delta coding the pixel component values. This reduces the amount of data needed to be stored and is compatible with DYUV coding used in the base case CD-I player. Reducing the amount of storage capacity required for a given image also reduces the rate at which the data has to be read from the storage device in order to display a picture. This is particularly important when the first and second sets of digital data are stored on CD-ROM, since the rate of information retrievable from the compact disc is relatively slow compared with the quantity of information required to produce an image on the display screen.

BRIEF DESCRIPTION OF THE DRAWINGS

These and other aspects of the invention will be apparent from the following description of preferred embodiments of the invention with reference to the accompanying drawings, in which.

DESCRIPTION OF THE PREFERRED EMBODIMENTS

Figure 1:
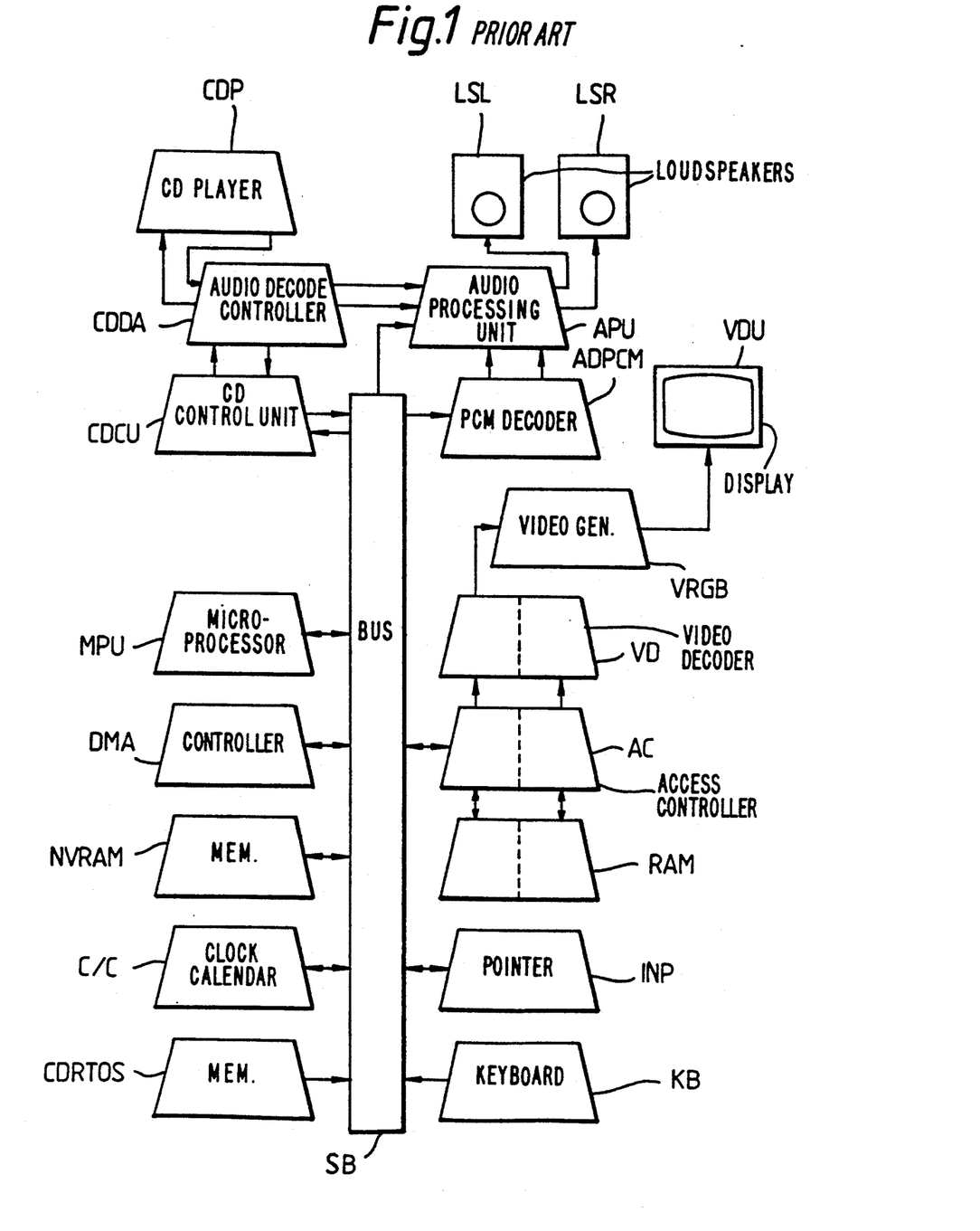
FIG. 1 shows in block schematic form the CD-I base case player.

FIG. 1 is a block schematic diagram of the compact discinteractive (CD-I) base case player. It comprises a compact disc player CDP to which is connected a compact disc digital audio controller decoder CDDA and a compact disc control unit CDCU. The CDDA is connected to an audio processing unit APU which feeds two loudspeakers LSL and LSR. The CD control unit CDCU is connected to a system bus SB along which various digital signals are passed. Also connected to the system bus SB are a microprocessor unit MPU, a DMA controller DMA, a non-volatile random access memory NVRAM, a clock calendar unit C/C, a read-only memory containing the operating system RTOS, a keyboard KB, a pointing device INP, and an access controller AC. The access controller controls the reading from and writing to a random access memory RAM which is split into two banks zero and one. The access controller is also connected to a video decoder VD which in turn feeds a video generator RGB, the output of which is connected to a video display unit VDU. Also connected to the system bus SB is an adaptive pulse code modulation decoder ADPCM which feeds the audio processing unit APU. A description of the CD-I base case decoder as shown in FIG. 1 is given in a text book entitled "Compact Disc-Interactive, A Designer's Overview" edited by Philips International and published by Kluwer Technical Books.

The present invention is concerned with the method of encoding video data to enable it to be stored on a compact disc using a code which reduces the storage capacity required for storing an image and of decoding the encoded video data within the CD-I base case player. Consequently those parts of the apparatus shown in FIG. 1 which are of particular importance in understanding the present invention are the random access memory RAM, the access controller AC, and the video decoder VD.

Figure 2:
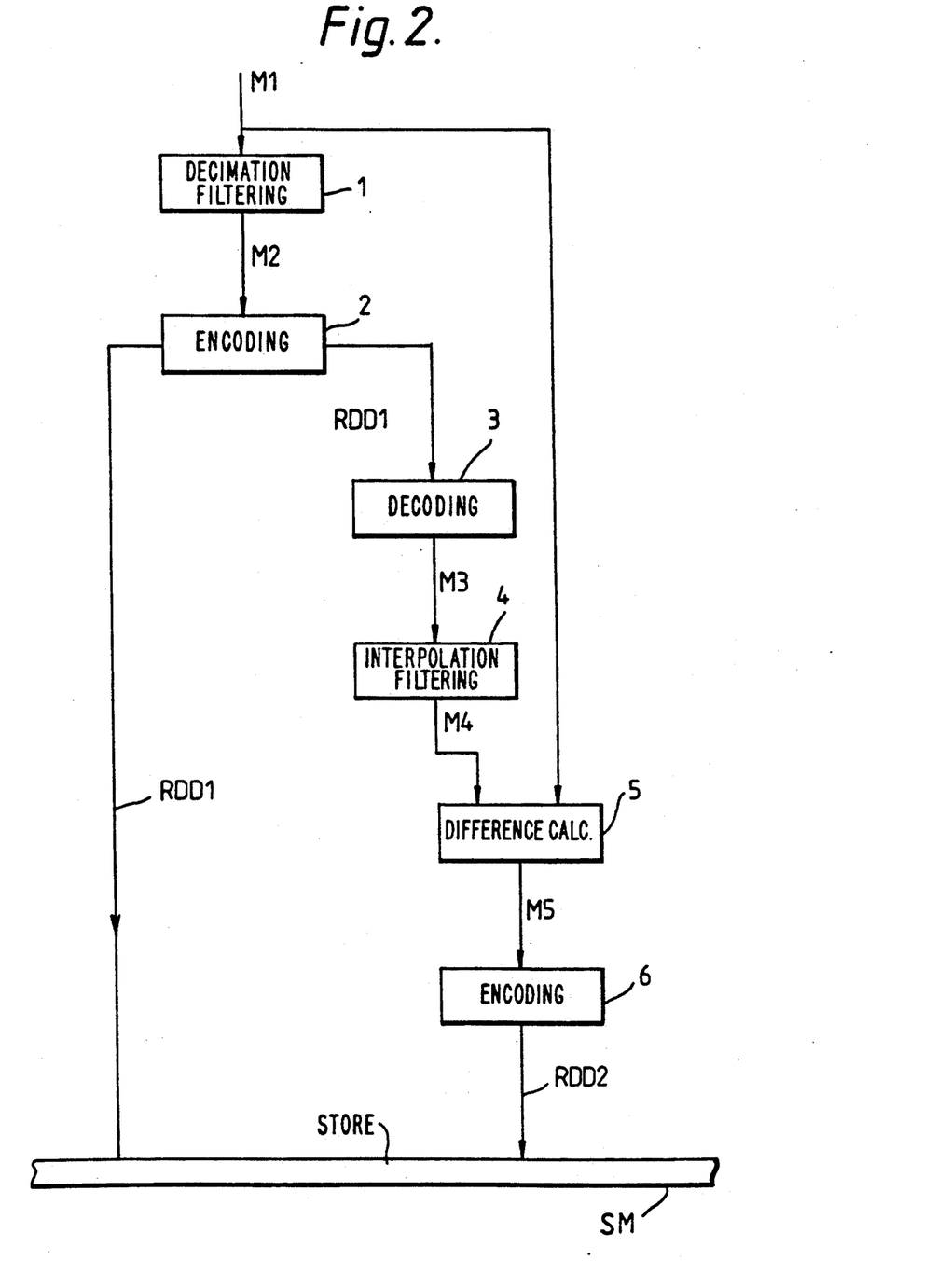
FIG. 2 is a representative diagram of an image encoding method according to the invention.

FIG. 2 of the drawings is a representative diagram of the image encoding method according to the invention. The method comprises a filtering step 1, an encoding step 2, a decoding step 3, a further filtering step 4, a difference step 5 and a further encoding step 6. Pixel information for at least one component of a plurality of pixels representing an image is supplied to the filtering step 1 and also to the difference step 5. The pixel information is assumed by way of illustrative example to comprise a first matrix M1 of 768×560 pixel component values. This pixel information is in respect of an enhanced resolution display which would be better than both standard 625 line camera resolution and studio quality and would require a high definition television screen for displaying the image concerned at enhanced resolution.

The filtering step 1 is effected by averaging adjacent pairs of elements in the horizontal direction so that a matrix M2 is of 384×560 pixel component values which are in respect of a reduced resolution image compared with the Pixel component values of matrix M1. The filtering step 1 may also average adjacent pairs of pixels in the vertical direction to reduce the matrix to 384×280 pixels. The encoding step 2 encodes the pixel values into a desired code, for example differential PCM code. The resultant digital data RDD1 is fed to a storage medium SM.

The resultant digital data RDD1 is also decoded in step 3 to produce a matrix M3 of 384×560 or 384×280 pixel component values. The decoding step 3 is carried out in the same manner as the decoding of the data read from a compact disc in the CD-I base case player. An interpolation filtering step 4 is then carried out to produce a matrix M4 of 768×560 pixel component values, but which will be of comparatively low resolution compared with that of the matrix M1 since it merely involves repeating each pixel along the matrix rows and if necessary repeating each row.

The difference step 5 takes the difference between the matrix M4 and the matrix MI on a pixel-by-pixel basis to produce a fifth matrix of difference values which are quantised coded by the encoding step 6 into a second set of resultant digital data RDD2. The resultant data RDD2 is stored in the storage medium SM in association with the resultant digital data RDD1.

The CD-I base case player has two video decoders which can each decode data in the form of differential PCM luminance and colour difference signals (DYUV) or in the form of addresses to a colour look-up table (CLUT) optionally in conjunction with run length codes. The pixel component values may be in the form of separate R,G,B components each of 8-bits for each pixel or may be encoded as Y, U and V components as is well known. Typically the Y component will be at twice the resolution of the U and V components to take into account the characteristics of the eye and reduce the storage capacity required for a given image. Thus, if the Y component has 768 pixels along a row (or display line) the U and V components will each have 384 pixels. In the DYUV code pairs of pixels are encoded in the form Y1,U,Y2,V where Y1 and Y2 are the luminance values of pixels and 2 and U and V are the average colour difference values of pixels 1 and 2. Alternatively U and V may be the colour difference values of either of the pixels 1 or 2 provided that U and V both refer to the same pixel.

In the embodiment described the first digital data RDD1 is encoded in DYUV form and the second digital data RDD 2 is encoded as addresses to a colour look-up table and is also run length coded so that difference values which are the same for a plurality of successive pixels can be encoded using a minimum quantity of data. However it would be possible to encode the data RDD1 also as addresses to a colour look-up table and to run length code the data.

Figure 3:
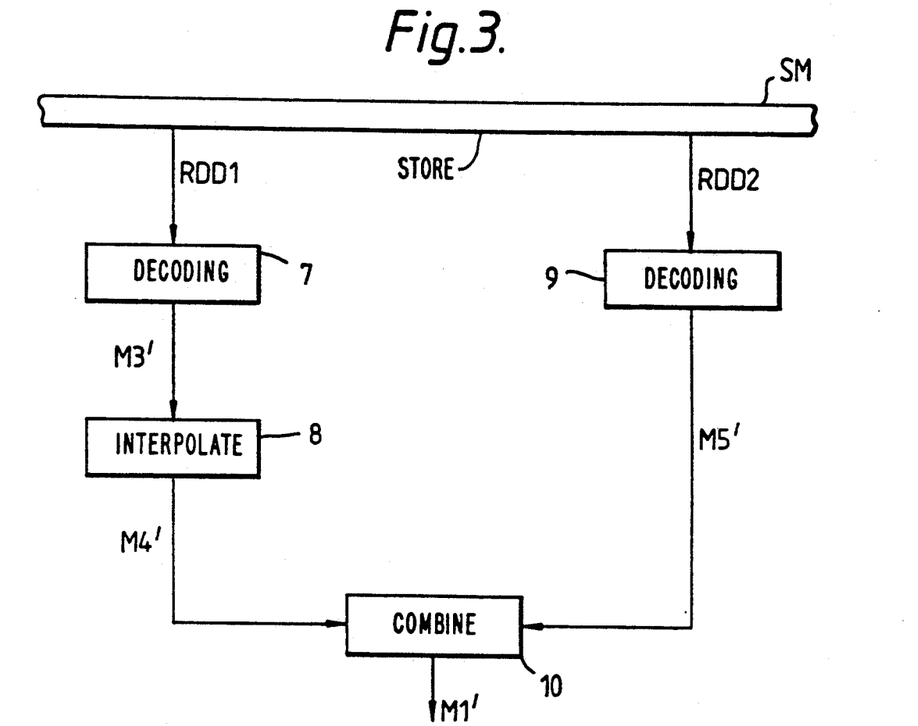
FIG. 3 is a representative diagram of an image decoding method according to the invention.

The representative diagram in FIG. 3 of a decoding method according to the invention shows a first decoding step 7, an interpolating step 8, a second decoding step 9 and a combining or addition step 10.

The first set of digital data RDD1 is read out from the storage medium SM and applied to the decoding step 7 which produces a reconstituted matrix M3' of 384×560 pixel component values. The interpolation filtering step 8 produces a reconstituted second matrix M4' of 768×560 pixel component values by repeating each pixel value along the row. The second set of digital data RDD2 is applied to the decoding step 9 which produces a reconstituted matrix M5' of 768×560 difference values. The two reconstituted matrices M4' and M5' are applied to the combining or addition step 9 which produces a reconstituted first matrix M' of 768×560 pixel component values. This reconstituted first matrix M1' constitutes resultant pixel information which can be used in respect of a high resolution display of the original image. The reconstituted third matrix M3' can be used in respect of a normal resolution display of the original image.

Figure 4:
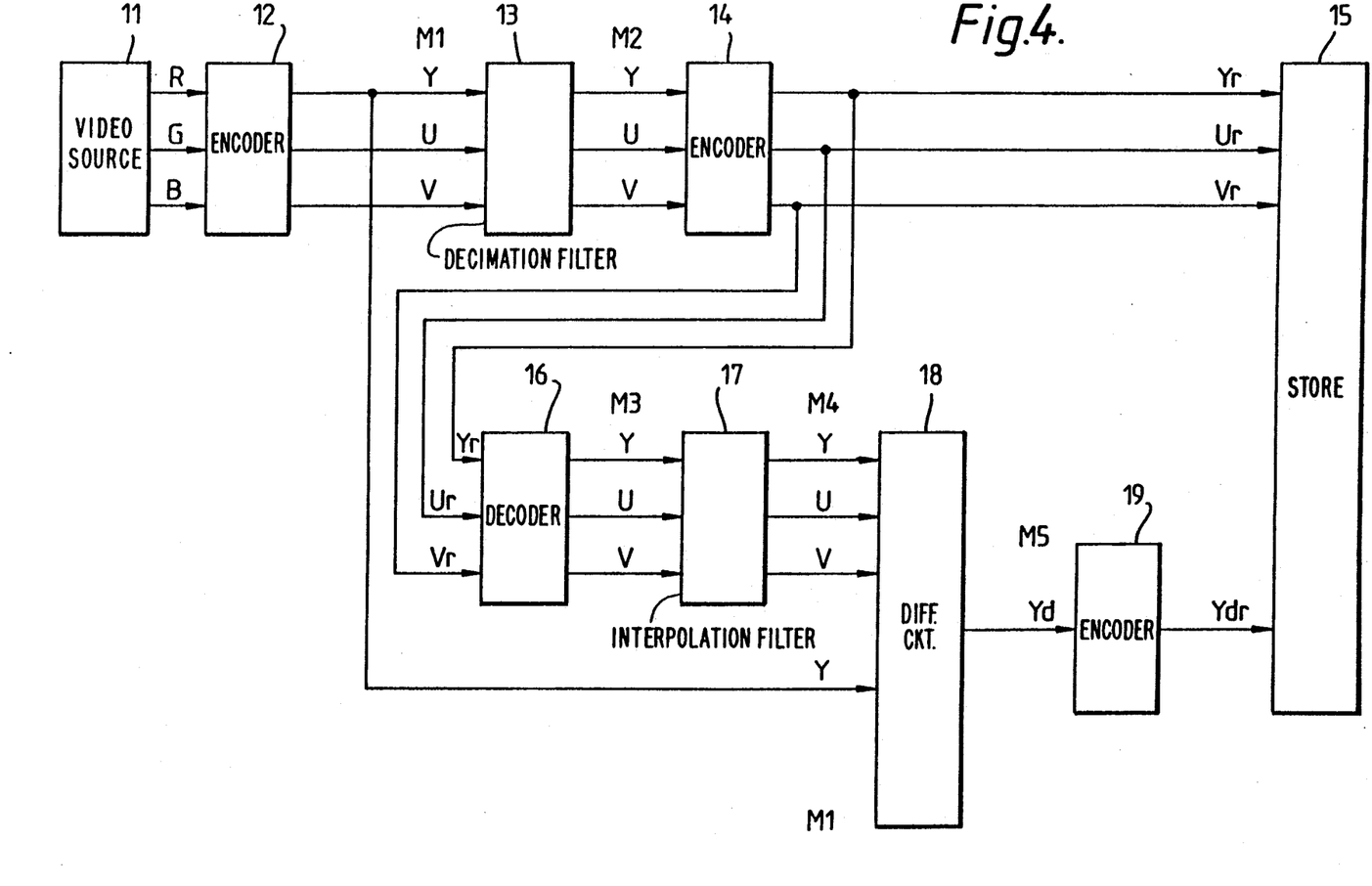
FIG. 4 is a block schematic diagram of another image encoding arrangement according to the invention.

FIG. 4 is a block schematic diagram of an encoding arrangement according to the invention. The encoding arrangement comprises a source of image information 11 which may be a video cameras video tape recorder, graphics generator, etc. and in this embodiment Provides separate red (R), green (G), and blue (B) outputs. These may be in either analogue or digital form. These signals (R,G,B) are fed to an encoder 12 which converts them to luminance (Y) and colour difference (U,V) signals in 8-bit digital form. If the source 10 has an output of different form, for example composite video of PAL, SECAM, or NTSC form, then the encoder 11 will be appropriately constructed to convert it into YUV form. The output of the encoder 12 forms the first matrix M1 of 768×560 pixels for the luminance (Y) component, each pixel being encoded as an 8-bit byte. The colour difference U and V components are also encoded as 8-bit bytes but are at half the density and therefore only 384 pixels in the horizontal direction. They may also be at half the density in the vertical direction. The YUV components are then fed to a decimating filter 13 in which the number of pixels is reduced to form a matrix M2 having 384×560 pixels for the Y component and 192×560 pixels for the U and V components by averaging the pixel component values in pairs. This reduced matrix of pixel component values (Y'U'V') is applied to an encoder 14 which reproduces resultant digital data (YrUrVr) in the form of a DYUV code for storing in a bulk memory 15, for example an optical disc. The code data is also fed to a decoder 16 which performs the same decoding process as the DYUV video decoder in the base case CD-I player and produces a matrix M3 of picture luminance component values which corresponds to that which would be produced by the base case CD-I player if the resultant code data was read out by it from a compact disc. An interpolation filter 17 then converts this matrix M3 into a matrix M4 of 768×560 pixels. This matrix of pixel values is fed to a first set of inputs of a differencing circuit 18. The matrix M1 of pixel luminance component values is fed to a second set of inputs of the difference circuit 18. It should be noted that the interpolating filter 17 need not be a separate hardware unit since each element of the matrix M3 could be applied twice to the differencing circuit 18 by appropriate clocking signals. The output of the differencing circuit 18 is the fifth matrix M5 of difference values and is encoded in an encoder 19 to provide the second digital data RDD2. The encoder 19 quantizes the difference values into a smaller number of codes and the resulting quantized values are coded either by a respective multi-bit code or as a run length code where successive difference values are equal.

Figure 5:
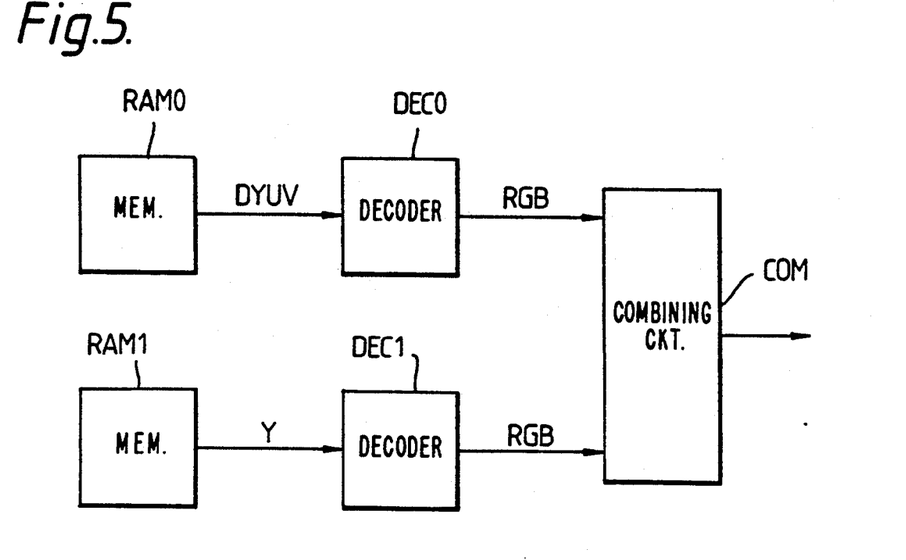
FIG. 5 is a block schematic diagram of that part of the CD-I base case player which carries out the image decoding method according to the invention.

FIG. 5 is a block schematic diagram of the random access memory RAM and video decoder VD in FIG. 1. The random access memory RAM is divided into two independent halves RAM0 and RAM1 while the video decoder comprises a first decoder DEC0 and a second decoder DEC1 which each feed a combining circuit COM. The first data signal RDD1 read from the storage medium SM is directed to the RAM0. In this embodiment it will be in DYUV form and is stored as two interlaced pictures of 384×280 pixels. The decoder DEC0 receives a signal from the access controller AC to set it into a mode which decodes a differential YUV signal. The second data signal RDD2 representing the luminance difference values is fed to the RAM1 where it is stored as addresses for a colour look-up table (CLUT). A signal from the access controller AC sets the decoder DEC1 into a mode where it decodes the data from the RAM I as addresses to a colour look-up table and also, where applicable, as run length coded data. The outputs from the decoders DEC0 and DEC1 which are in the form of 8-bit RGB signals are fed to the combining circuit COM where they are added together.

The combining circuit COM treats the input signals as being within the limits set by the CCIR recommendations for TV studio operation involving digital signals, that is that black level is represented by 16 on a scale from 0 to 255 and peak white is represented by 235. If the output from the decoder DEC1 and that from the decoder DEC0 both represent black level, the output of the combining circuit COM has to be arranged to be a digital level of 16. Thus, the arithmetic within the combining circuit COM will produce an answer 16 when two inputs having a value 16 are added together, in other words it will automatically subtract 16 from the sum before Producing the output. If, therefore, a code of 0 is produced by the decoder DEC0, then this is effectively a value of −16. This would allow the difference signal to take values from −16 to +220. This leaves a lot of headroom in the positive direction for a difference but a relatively restricted headroom in the negative direction. It should be noted that positive and negative difference values are equally probable. However, these difference values are likely to be relatively small compared with the absolute value of Y. Consequently some added detail can be achieved merely by allowing the difference signal to take values in the range from −16 to +16. In practice, however, this range is not sufficient to produce a fully acceptable high resolution display.

It is possible to improve the high resolution display image by obtaining a wider effective range of negative difference values. This can be achieved by subtracting a constant value, for example 32, from the pixel values of the low resolution image at the encoding stage. When this subtraction is compensated for by adding 32 to the high resolution difference values, a code of zero in the difference image then effectively represents a difference of −48.

The compensating additions to the difference values to account for subtraction from the low resolution image values will be incorporated automatically if the original high resolution image matrix M1 (before subtraction) is used in comparison with the reconstituted matrix M4 to form the difference values, in the same way as other errors in the DPCM coding are corrected. The subtraction can be incorporated for example in the decimation filtering step 1 (FIG. 2) or as a preliminary to the encoding step 2.

Assuming a value of 32 for the constant to be subtracted, the following numerical example is presented by way of illustration. If it is desired to couple a Y value of 47 in the low resolution image with a difference value of −20, this can be achieved by encoding 47−32=15 in the low resolution image and encoding −20+16+32=28 in the difference image. The result produced by the combiner COM when displaying the image is 15+28−16=27, that is the same as the desired result 47−20=27.

Of course, any pixel values of less than 32 in the low resolution image would become negative after subtraction of the constant 32. This is prevented in the proposed process by setting zero as a lower limit for these values. At first sight this would appear to lose some of the information. However, the encoding process will automatically restore the lost negative pixel values by adjustment of the Y-difference value for the relevant pixels.

For example, if it is desired to couple a pixel value of 29 (13 above black level) with a difference value of −9, the encoder first performs the subtraction of 32 from the pixel values of the low resolution image, and the value 29 is encoded as zero. The true value 29−32=−3 is therefore lost from the low resolution image (data RDDL). However, −3 is added to the Y-difference value for the relevant pixels so as to compensate for this lost information. Thus −9−3+16+32=36 is encoded in the high resolution Y-difference information (data RDD2). The result produced by the combiner COM when displaying the image is 0+36−16=20, that is the same as the desired result 29−9=20.

Of course, subtracting a value other than 32 will allow a different effective range for the difference values, and the value can even be varied to suit different images or parts of images. Typically, in the 8-bit coding environment described, these values will be in the range zero to 40, giving a negative difference limit between −16 and −56 accordingly.

It should be appreciated, moreover, that when a large number of values would have become negative by the subtraction of this chosen constant, the large amount of lost information which has to be incorporated into the difference image data (RDD2) comprises low resolution information not suited to the run-length or other compression coding employed for the difference values. Thus the degree of compression may be reduced, and/or quantisation noise may arise in the final displayed image, defeating the original aims of the encoding method. Therefore the subtracted constant should be limited to an optimum compromise level. It may be noted in this respect that subtracting a constant of only 16 from the pixel values of the low resolution image will ensure that only information from pixel values in the guard range of zero to 15 is lost. Since these values are naturally rare in a typical image, the choice of 16 for the subtracted constant represents a safe compromise for all pictures, while allowing the encoding of difference values down to −32.

The encoded data may be decoded using the standard base case CD-I player by utilising the hardware present in such a base case player. The low resolution 384×560 pixel information for one frame is stored as two fields of 384×280 pixels in DYUV form which takes up about 200K bytes of memory in the RAM0. The data required for the difference signal is considerably smaller since it can be encoded as a three or four bit colour look-up table code which may be run coded, that is in a single 8-bit byte stored within the RAM1 two pixel difference values can be stored as four bit addresses to the colour look-up table. Additionally, since many of the difference signals will be constant for several pixels, a further saving can be added by run length coding these pictures. The access controller AC produces a signal to the decoder DEC1 to inform it that run length coded four bit colour look-up table codes are being presented to it, whereupon the decoder is adjusted to decode signals of that form.

The coding scheme described herinbefore has used an interlaced 384×560 DYUV low resolution image as the first set of digital data and an interlaced 768×560 colour look-up difference value which is optionally run coded as the second set of digital data. It is possible to encode the pixel component values of the low resolution image in a different manner to produce a different trade-off between quality and memory capacity required in the mass storage medium (CD) and the RAM0 in the CD-I player. Examples of such alternatives are listed below:

1) A single standard DYUV image may be repeated in both fields. This will save memory capacity since only 384×280 pixels need to be stored per frame and requires no software recoding at load time.

2) A DYUV image may be formed as separate Y and UV components which are assembled by means of a loader program. The Y component may be provided with data for one or both fields. The UV data can be interpolated or repeated in both or either of the vertical or horizontal directions.

3) Interpolation in the horizontal direction may be performed by means of look-up tables (UVLO) as described in non-prepublished British applications GB-2 230 673-A and GB-2 231 223-A of the present assignee.

4) Interpolation in the vertical direction may be performed by decoding the delta coded signals, averaging and recoding.

5) All the signals on the disc may be further compressed by variable length statistical coding, for example Hufmann or modified Hufmann codes.

6) The basic 384×560 (or 384×280) pixel array may be encoded as CLUT addresses with or without run length coding as an alternative to the DYUV coding.

Moreover, in another application of the encoding and decoding methods described above, the CD-I player can operate to display a high resolution image which has been stored (for example on an optical disc) or transmitted in a form other than as a low resolution image and difference image. For example, a high resolution image may be stored in PCM-coded (not DPCM) Y,U,V component values of 8 bits each for each of 768×560 pixels. For display purposes, the microprocessor MPU of the CD-I player can perform the encoding method described above, under control of a program also stored on the disc, to generate in its display memory first and second sets of digital data. Having done this, the player can then display the image using the decoding method and apparatus described above. In such an application, the role of the storage device referred to above is played by the display memory alone, not the optical disc itself.

From reading the present disclosure, other modifications will be apparent to persons skilled in the art. Such modifications may involve other features which are already known in the design, manufacture and use of image transmission and storage systems, display apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features in further patent applications derived herefrom or otherwise.

I claim:

1. A method of image encoding by which pixel information for at least one pixel component value of each of a plurality of pixels forming an image is encoded into digital data which can be recorded on or in a suitable storage device, comprising the steps of:

a) receiving the pixel information in the form of a first matrix of m×n pixel component values, where m and n are integers, b) decimation filtering the first matrix of pixel component values to produce a second matrix of m/a×n/b pixel component values of reduced density, where a and b are factors of m, c) encoding the second matrix of pixel component values into a first set of digital data for storage, by reference to a finite range of unsigned quantisation values, which range includes a guard range extending below black level, d) decoding the encoded second matrix of pixel component values to form a third matrix of m/a×n/b pixel component values, e) expanding the third matrix of pixel component values to form a fourth matrix m×n pixel component values, f) forming a difference between the fourth and the first matrix pixel-by-pixel so as to produce a fifth matrix of m×n difference values, and g) encoding the fifth matrix of difference values into a second set of digital data for storage, characterized in that in step (g) said difference values are encoded by reference to the same finite range of unsigned values as used in step (c), negative difference values being represented by values within said guard range.

2. A method of decoding digital data obtained by an encoding method as claimed in claim 1, to reconstruct the original pixel information, comprising the steps of:

h) decoding the first set of digital data to reconstruct the third matrix of m/a×n/b pixel component values, i) expanding the third matrix to reconstruct the fourth matrix of m×n pixel component values, j) decoding the second set of digital data to reconstruct the fifth matrix of m×n difference values, and k) adding the fifth matrix to the fourth matrix on a pixel-by-pixel basis to reconstruct the first matrix of m×n pixel component values.

3. A method of image encoding as claimed in claim 1, in which the at lest one pixel component value comprises a luminance (Y) value, the pixel information further comprising colour difference (U,V) values.

4. A method as claimed in claim 3 in which said luminance value is quantized to 8 bits signifying a value within a range zero to 255, with black being represented by a value of 16.

5. A method of storing an image comprising encoding the image by a method as claimed in claim 1 and storing the first and second sets of digital data in a storage device.

6. A method of storing an image as claimed in claim 5 in which the storage device comprises an optical disc.

7. A method of image encoding as claimed in claim 1, further characterized by the step of:

prior to the encoding in step (c), subtracting a first given values from the component value of each of the pixels of the first or second matrix.

8. A method of image encoding as claimed in claim 7 in which the first given value is in the range zero to 40.

9. A method as claimed in 7 in which, for any pixel component value which would become negative as a result of the subtraction of the first given value, its value is forced to zero.

10. A method of image encoding as claimed in claim 1, in which step c) includes delta encoding the pixel component values of said second matrix and step g) includes quantizing the difference values of the fifth matrix into a smaller number of quantized values and encoding the quantized difference values either by a respective multi-bit code or as a run length code for successive pixels having the same quantized value.

11. A method of storing an image comprising encoding the image by a method as claimed in claim 10 and storing the first and second sets of digital data in a storage device together with information defining the quantisation values employed in step g) of the method.

12. A method of storing an image as claimed in claim 11 in which the storage device comprises an optical disc.

* * * * *